(12) United States Patent
Berglund

(10) Patent No.: US 8,689,973 B2
(45) Date of Patent: Apr. 8, 2014

(54) GARMENT BAG SYSTEMS

(76) Inventor: Stephen Berglund, Fresno, CA (US)

( * ) Notice: Subject to any disclaimer, the term of this patent is extended or adjusted under 35 U.S.C. 154(b) by 6 days.

(21) Appl. No.: 13/041,625

(22) Filed: Mar. 7, 2011

(65) Prior Publication Data

US 2011/0192740 A1 Aug. 11, 2011

Related U.S. Application Data

(63) Continuation-in-part of application No. 12/703,673, filed on Feb. 10, 2010, now abandoned, and a continuation-in-part of application No. 29/386,118, filed on Feb. 24, 2011, now Pat. No. Des. 651,404, and a continuation-in-part of application No. 29/355,347, filed on Feb. 5, 2010, now Pat. No. Des. 637,396, and a continuation-in-part of application No. 29/355,588, filed on Feb. 10, 2010, now Pat. No. Des. 633,715.

(51) Int. Cl.
*B65D 85/18* (2006.01)
*B65D 33/14* (2006.01)

(52) U.S. Cl.
USPC ........... 206/278; 206/279; 206/286; 206/289; 206/288; 383/2; 383/23; 383/22; 383/37

(58) Field of Classification Search
USPC .......................... 206/286, 288–290; 383/2, 23
See application file for complete search history.

(56) References Cited

U.S. PATENT DOCUMENTS

| | | | |
|---|---|---|---|
| 1,305,797 A * | 6/1919 | Henderson | ................... 190/109 |
| 1,452,644 A | 4/1923 | Kennedy | |
| 1,463,002 A | 7/1923 | Barnet | |
| 1,476,423 A * | 12/1923 | Salisbury | ........................ 383/13 |
| 1,537,956 A * | 5/1925 | McNally | ........................... 383/2 |
| 1,666,704 A * | 4/1928 | Hunter | ............................... 383/2 |
| 1,870,169 A | 8/1932 | Brown | |
| 2,088,232 A * | 7/1937 | Cumming | ...................... 383/62 |
| D115,502 S | 7/1939 | Kohl | |
| 2,170,841 A * | 8/1939 | Thies et al. | ..................... 383/15 |
| 2,210,755 A * | 8/1940 | Frank | ............................ 150/113 |
| 2,534,380 A | 12/1950 | Schwartzman | |
| 2,637,424 A | 5/1953 | Duskin | |
| D174,064 S | 2/1955 | Snook | |
| D179,745 S | 2/1957 | Snook | |
| 2,815,785 A | 12/1957 | Vail | |
| 2,861,735 A * | 11/1958 | Faltin | ............................... 383/11 |
| 3,142,324 A * | 7/1964 | Fremont | ....................... 383/120 |

(Continued)

OTHER PUBLICATIONS

Cleaner's Supply advertisement for "Converta" bag dated Jan. 4, 2010.

(Continued)

*Primary Examiner* — Tri Mai

(74) *Attorney, Agent, or Firm* — Mark D. Miller; William K. Nelson

(57) ABSTRACT

The present invention includes methods and apparatus in which a reusable bag is provided for the collection and return of soiled garments, laundry and/or other clothing items. The bag may be provided in the form of a hamper that is open at the top, with one or more hooks that allow the bag to be hung from a clothing rod, and is provided with engagement devices that allow the bag to be folded up when not in use, and then unfolded to various levels for containment and protection of clean items that have been hung on standard hangers. In some embodiments, garment protection flaps are provided inside the bag.

22 Claims, 18 Drawing Sheets

(56) References Cited

U.S. PATENT DOCUMENTS

| | | | |
|---|---|---|---|
| 3,164,187 A * | 1/1965 | Simmons | 150/112 |
| 3,388,777 A | 6/1968 | Nolan | |
| 3,495,763 A * | 2/1970 | Kamins et al. | 383/13 |
| 3,558,038 A * | 1/1971 | Gelles et al. | 383/15 |
| D223,700 S | 5/1972 | Kamins et al. | |
| 3,670,947 A | 6/1972 | Tangredi et al. | |
| 3,929,224 A | 12/1975 | Smith, Jr. | |
| 3,934,497 A | 1/1976 | Hannah | |
| D242,764 S | 12/1976 | Kamins | |
| 4,000,768 A | 1/1977 | Siegel | |
| 4,084,689 A | 4/1978 | Yamagata | |
| 4,189,036 A | 2/1980 | Pelavin | |
| 4,244,453 A | 1/1981 | Herz | |
| 4,390,087 A | 6/1983 | Goldfinger | |
| 4,391,396 A | 7/1983 | Brady | |
| 4,401,219 A | 8/1983 | Mink | |
| 4,438,844 A | 3/1984 | Kesselman et al. | |
| D282,315 S | 1/1986 | Allen | |
| 4,580,667 A | 4/1986 | Herwood | |
| 4,590,610 A | 5/1986 | Rhyne | |
| D307,360 S | 4/1990 | McAllister | |
| 5,002,183 A | 3/1991 | Okano | |
| 5,010,987 A | 4/1991 | Evans | |
| D321,790 S | 11/1991 | Martorella | |
| 5,062,717 A | 11/1991 | Shockley | |
| 5,065,864 A * | 11/1991 | Schmitt | 206/278 |
| 5,090,559 A | 2/1992 | Gendreau | |
| D327,371 S | 6/1992 | Walker | |
| 5,117,974 A | 6/1992 | Bieber | |
| 5,253,775 A | 10/1993 | Gould | |
| 5,370,230 A | 12/1994 | Cox | |
| D369,025 S | 4/1996 | Miller et al. | |
| D371,737 S | 7/1996 | May | |
| D377,863 S | 2/1997 | Van Skiver | |
| 5,628,398 A | 5/1997 | Jackson | |
| D383,904 S | 9/1997 | Steward | |
| D385,419 S | 10/1997 | Ibigbami | |
| D422,903 S | 4/2000 | Lim | |
| 6,296,094 B1 * | 10/2001 | Knecht | 190/107 |
| 6,708,819 B1 | 3/2004 | Lee | |
| 6,811,027 B2 | 11/2004 | Alexander | |
| D499,548 S | 12/2004 | Deutschendorf et al. | |
| D505,547 S | 5/2005 | Whipple | |
| D602,760 S | 10/2009 | Davis | |
| D633,715 S | 3/2011 | Berglund | |
| D637,396 S | 5/2011 | Berglund | |
| D651,404 S | 1/2012 | Berglund | |
| 2003/0102230 A1 | 6/2003 | Gregorcic | |
| 2003/0179958 A1 | 9/2003 | Chiang et al. | |
| 2007/0183691 A1 * | 8/2007 | Finnegan | 383/23 |

OTHER PUBLICATIONS

Advertisement for "Green Garmento" bag, American Drycleaner, p. 25, Jan. 2010.
U.S. Trademark Registration No. 1768697 dated May 14, 1993.

* cited by examiner

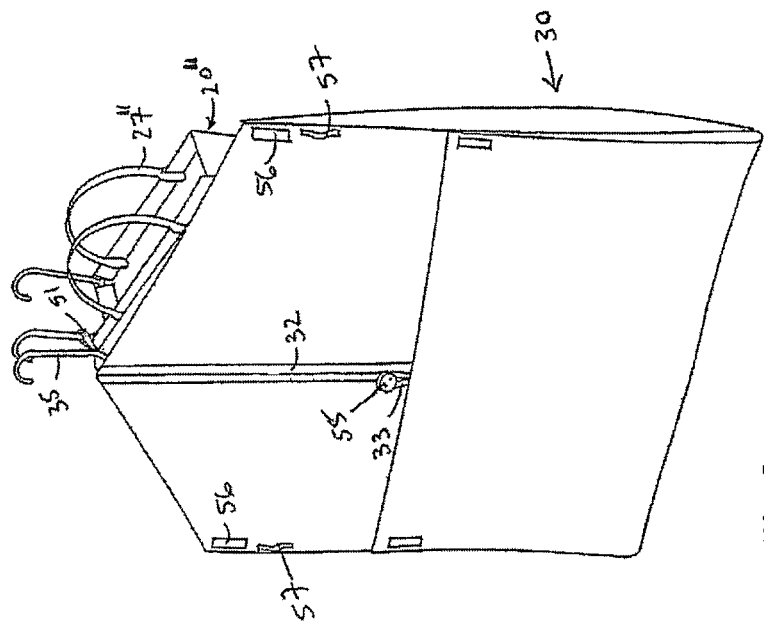
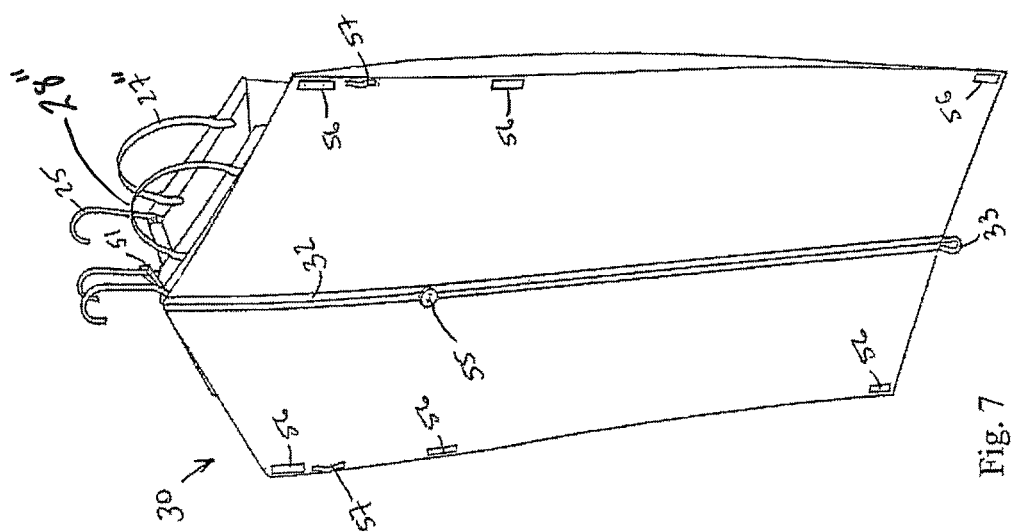

GARMENT BAG SYSTEMS

Priority Claim

This is a continuation-in-part of U.S. Utility patent application Ser. No. 12/703,673 filed on Feb. 10, 2010 which is incorporated herein by this reference. This application also claims the benefit of U.S. Design Pat Application No. 29/386,118 filed on Feb. 24, 2011, which is a continuation-in-part of, and claims the benefit of U.S. Design Patent Application No. 29/355,347 filed on Feb. 5, 2010, and U.S. Design Patent Application No. 29/355,588 filed on Feb. 10, 2010, all of which are incorporated herein in their entirety by this reference.

BACKGROUND OF THE INVENTION

1. Field of the Invention

The present invention relates to the transportation of garments, clothing and other items to and from a laundry or dry cleaner, and more particularly to improved multiple garment bag systems and methods of use that conserve natural resources by avoiding unnecessary use of polypropylene garment and dry cleaning bags.

2. Description of Related Art

Bags for carrying dry cleaning and laundry, as well as luggage for carrying garments are known in the art. Often, dry cleaning and laundry service providers will provide reusable bags to their customers for use in collecting soiled or dirty laundry, garments and/or other items of clothing to be laundered or dry cleaned. When full, the bag filled with such items is delivered to the facilities of the laundry or dry cleaner. The items are then cleaned, and folded or hung on hangers by the cleaner according to instructions from the customer. Typically, large polypropylene sheets or bags are pulled over groups of clean hanging items to prevent them from being soiled during the return trip to the customer. The empty garment bag is also returned.

A typical reusable laundry or dry cleaning transport bag has an opening at one end that may be opened wide for insertion of garments, clothing and/or other items and then pulled closed using a drawstring or other cord. Another well known style of reusable laundry bag is provided with one or more hooks that allow the bag to be hung from a closet clothing rod for convenient storage, such as those shown in U.S. Pat. Nos. 2,815,785; 5,370,230 and 6,708,819. Such bags are typically only used for transportation of dirty or soiled items. Once cleaned, these items are not returned to the customer in the same bag, but are separately hung and wrapped in polypropylene, or folded and placed in containers such as boxes, or the like.

The use of polypropylene bags in the laundry/dry cleaning industry is wasteful in that they are made from scarce petroleum resources, and they are almost immediately discarded following return of the cleaned garments to the customer. In addition, large polypropylene sheets and bags pose a suffocation hazard to small children. The garment bag disclosed in U.S. Pat. No. 5,090,559 avoids the use of polypropylene by providing a dual-use bag having a large opening with a drawstring at one end, and a small opening at the other end. The bag is cleaned along with the laundry, then inverted, and pulled over the clean laundry, with the hanger hook(s) protruding through the small opening in the opposite end. However, this invention requires that the bag itself be made of sufficiently flexible, cleanable material which is likely to wear out in a relatively short period of time after several cleanings.

It is therefore desirable to provide systems, methods and apparatus for transportation of garments, clothing and other related items that avoids the use of polypropylene for the return of dry cleaned and laundered items, and that provides durable and long-lasting bags that may be used over and over to collect and return cleaned garments and clothing items to a customer.

SUMMARY OF THE INVENTION

The present invention includes methods and apparatus in which a first reusable bag is provided for the collection of soiled garments, laundry and/or other clothing items, and a second (and sometimes a third) reusable bag is provided for the return of these items after they have been cleaned. In some embodiments of the invention, the first bag is provided in the form of a hamper that is open at the top, and has one or more hooks that allow the bag to be hung from a clothing rod, such as those found in a closet. One or more handles may also be provided on the first bag to facilitate easy transport.

In most embodiments, the first bag is made of durable fabric, canvas, or the like, and includes an upper opening that may be opened wide to receive soiled or dirty garments, laundry and/or other clothing items. In these embodiments, the first bag includes two broad opposing side panels that are attached together at the bottom, and two opposing foldable end panels between the broad side panels, the four panels forming a hamper with an open top. As clothing items are inserted into the first bag in these embodiments, the end panels unfold to allow the bag to receive them. In these embodiments, a first hook is provided at a top edge of one of the side panels, and a second hook is provided at a top edge of the other side panel. These hooks are used to hang the first bag from a clothing rod, for example in a wardrobe closet or armoire. In these embodiments, a first handle may be provided along the top edge of one of the side panels, and a second handle may be provided along the top edge of the other side panel to allow a user to grasp and hold the bag during transport.

Embodiments of the invention include a second foldable bag that is provided with and may be attached to the first bag, the second bag being in a form that may be folded up when not in use, and then unfolded for containment of clean clothing and garments that have been hung on hangers. In some embodiments, the second bag may include one or more attachment means (buttons, loops, snaps, Velcro®, or the like) to hold the folded portions of the second bag together when not in use. In most embodiments, the second bag is provided with a strap or loop at its bottom that is placed over a hook at the top of the adjacent side panel of the first bag to hold the folded second bag in place against the side panel.

In most embodiments, the second bag includes an elongated opening along one side for receiving garments hung on hangers, and an opening at the top to receive these hanger hooks. The side opening may be closed using a zipper or other attachment means (buttons, loops, snaps, Velcro®, or the like) for closing the second bag around clean garments. In some embodiments, the second bag may include a loop or strap near the top that may be placed over one of the hooks of the first garment bag for holding the second bag adjacent to the first. In some embodiments, the second bag may include a metal piece or bracket near the top having an opening therein that may be placed over one of the hooks of the first garment bag for holding the second bag adjacent to the first.

In some embodiments, the second bag may include one or more attachment means (buttons, loops, snaps, Velcro®, or the like) for folding portions of the second bag against other portions of the second bag for partial folding of the second bag. These attachment means allow the second bag to be partially folded while holding shorter clean garments such as shirts or blouses, and allows the bag containing clean garments to be placed on a conveyor for shorter garments.

In some embodiments the second bag may include expandable pleats along its sides; in these embodiments, the second bag may also include one or more upper flaps that may be folded over the tops of the numerous garments inside the second bag to protect the tops of these garments from dust, dirt, water or other materials when the filled bag has been expanded open. In some embodiments, the first bag is made of a more durable and less flexible material than the second bag; in other embodiments the first and second bags are made of the same type of material.

In some embodiments, a loop or metal bracket having an opening therein may be provided in the second bag to be looped over one of the hooks of the first bag in order to keep the two bags adjacent to one another. In most embodiments, the second bag is longer than the first bag, and is designed to be long enough to hold a cleaned suit, dress or gown. In most embodiments, the second bag is provided in the form of a suit bag, and is designed to be folded up into a compact form against a side panel of the first bag when not in use (e.g., when dirty items are being collected in the first bag). In these embodiments, the second bag is provided with an opening at its top for receiving the hanger hooks of cleaned items when they are inserted into the unfolded second bag. In some embodiments of the second bag, this upper opening is larger in order to accommodate many garment hangers, and one or more internal flaps are provided to be folded over the tops of the garments to protect them from dust, dirt, water and other materials.

In some embodiments, the second bag may be attached to one of the side panels of the first bag, with the top of the second bag being attached at, near or along a portion of the top edge of the first bag side panel. If the second bag is detachable, it may be temporarily held in place against the side panel of the first bag using the loop, strap or metal bracket described above, or one or more snaps, buttons, clips, zippers, inter-engaging hooks and loops (Velcro®), or the like. These alternative attachment devices are preferably provided at the top of the second bag, but may alternatively be provided in other locations in order to secure the second bag against a side panel of the first bag.

In some embodiments, a third bag having some or all of the same features as the second bag may be provided for use on the opposite side panel of the first bag, to provide additional capacity for the return of cleaned items.

In some embodiments, the second bag is provided stand-alone, without the first bag.

In alternative embodiments, an optional, detachable accessory bag may be provided for insertion inside the first bag of the invention. In these embodiments, the accessory bag is made of a mesh or netting material, and is designed for attachment to an inside of one of the side panels of the first bag. The accessory bag may be temporarily held in place inside the first bag using one or more snaps, buttons, clips, zippers, inter-engaging hooks and loops (Velcro®), or the like. The accessory bag may include a zipper along an edge (e.g. along the top) for opening and closing the accessory bag for insertion and removal of small items of clothing. The accessory bag containing small clothing items inside is designed to be removed and cleaned with the small clothing items inside it.

Exemplary Method of Use

In typical methods of use, the user hangs the first bag on a clothing rod in a closet, with the second bag folded up against one side of the first bag. Soiled garments and clothing items are collected in the first bag until it is full enough to take to the laundry/dry cleaner. The laundry/dry cleaner removes the garments and clothing items from the first bag and cleans them. The clean garments and clothing items are then hung on hangers. The second bag is unfolded and unzipped, and the clean hanging items are inserted into the second bag, with their hanger hooks protruding through the opening in the top of the second bag. The second bag is then zipped up to protect the clean items inside, and returned to the user, with the second bag protecting the clean items during transport. In some embodiments, if only short items (shirts or blouses) are inserted into the second bag, it may be partially folded up with the clean items inside so that it may fit onto a conveyor for shorter garments. In some embodiments, if a large number of items may be placed in the second bag causing the upper opening to be opened wide, flaps inside the second bag may be folded over the tops of these items to protect them from foreign materials that could enter through the opening. Upon or following return of the bags, the user removes the clean items from the second bag, and then folds the second bag up against a side of the first bag. The cycle is then repeated, with dirty and soiled garments again being collected in the first bag until it is full enough to take to the laundry/dry cleaner.

It is to be appreciated that use of the multiple bag systems of the present invention avoids the need for wasteful use of polypropylene sheets, bags or other wrapping around the cleaned garments or clothing items. It is also to be appreciated that it is not necessary to clean the bags of the multiple bag systems of the present invention since dirty and soiled items will always be placed in the first bag, and cleaned items will always be placed in the second (and third) bag.

It is therefore an object of the present invention to provide methods and apparatus for protecting garments and clothing items as they are transported to and from a laundry/dry cleaner without the use of polypropylene bags or sheets. It is also an object of the present invention to provide a convenient reusable transport system for garments, clothing and other items that protects cleaned items during their return.

These and other objects, advantages, and features of the invention, together with methods for using of the invention, will become apparent from the following detailed descriptions, drawings and claims herein.

BRIEF DESCRIPTION OF THE DRAWINGS

FIG. 7 is a perspective view of another embodiment of the present invention with the second bag in an unfolded condition.

FIG. 8 is a perspective view of the embodiment of FIG. 7 with the second bag in a partially folded condition.

FIG. 26 is a perspective view of an embodiment of the present invention in an open condition showing internal flaps folded in.

FIG. 28 is a top perspective view of an embodiment of the present invention in an open condition showing internal flaps folded in.

DETAILED DESCRIPTION

Figure 1:
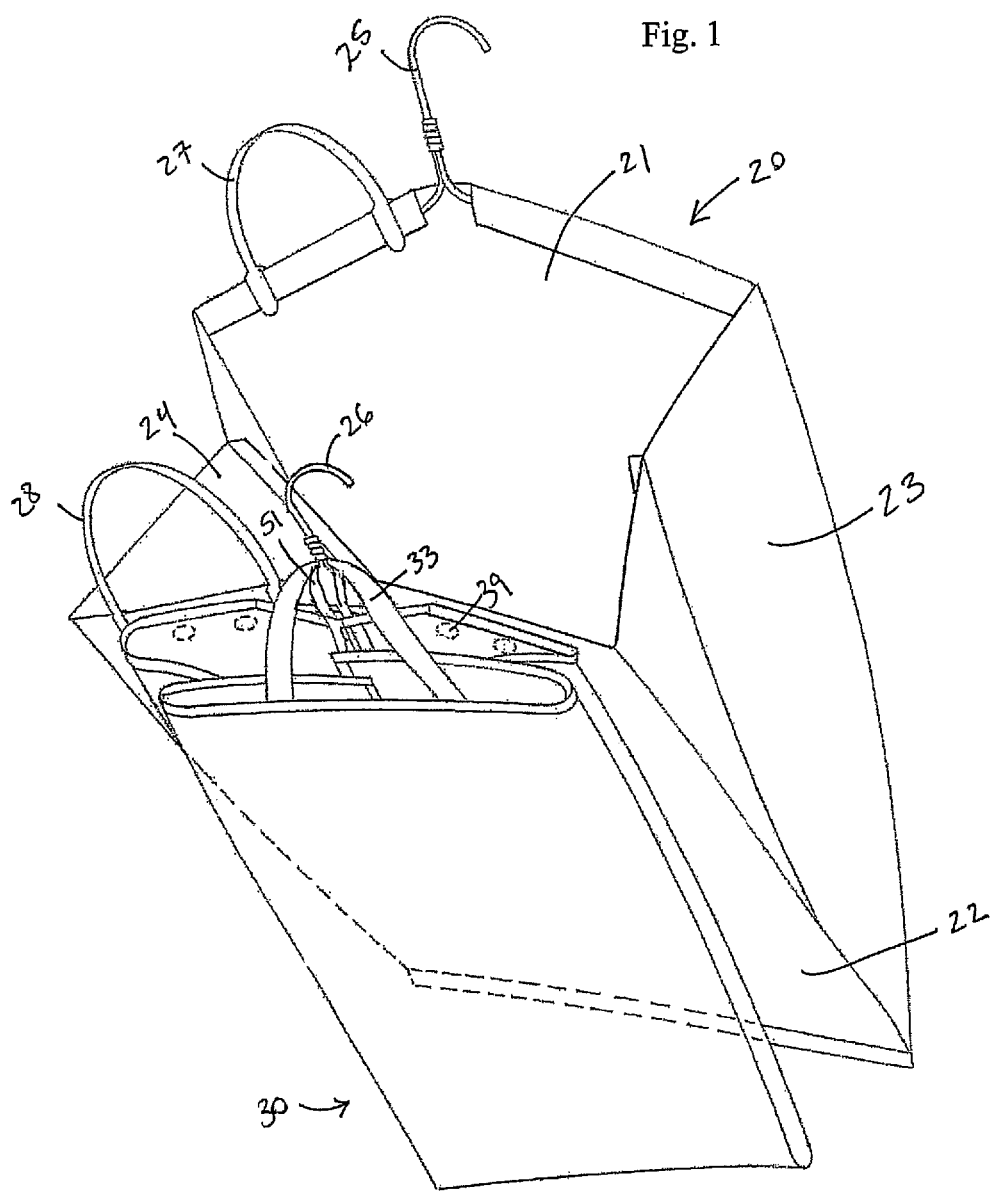
FIG. 1 is a perspective view of an embodiment of the present invention.
Figure 2:
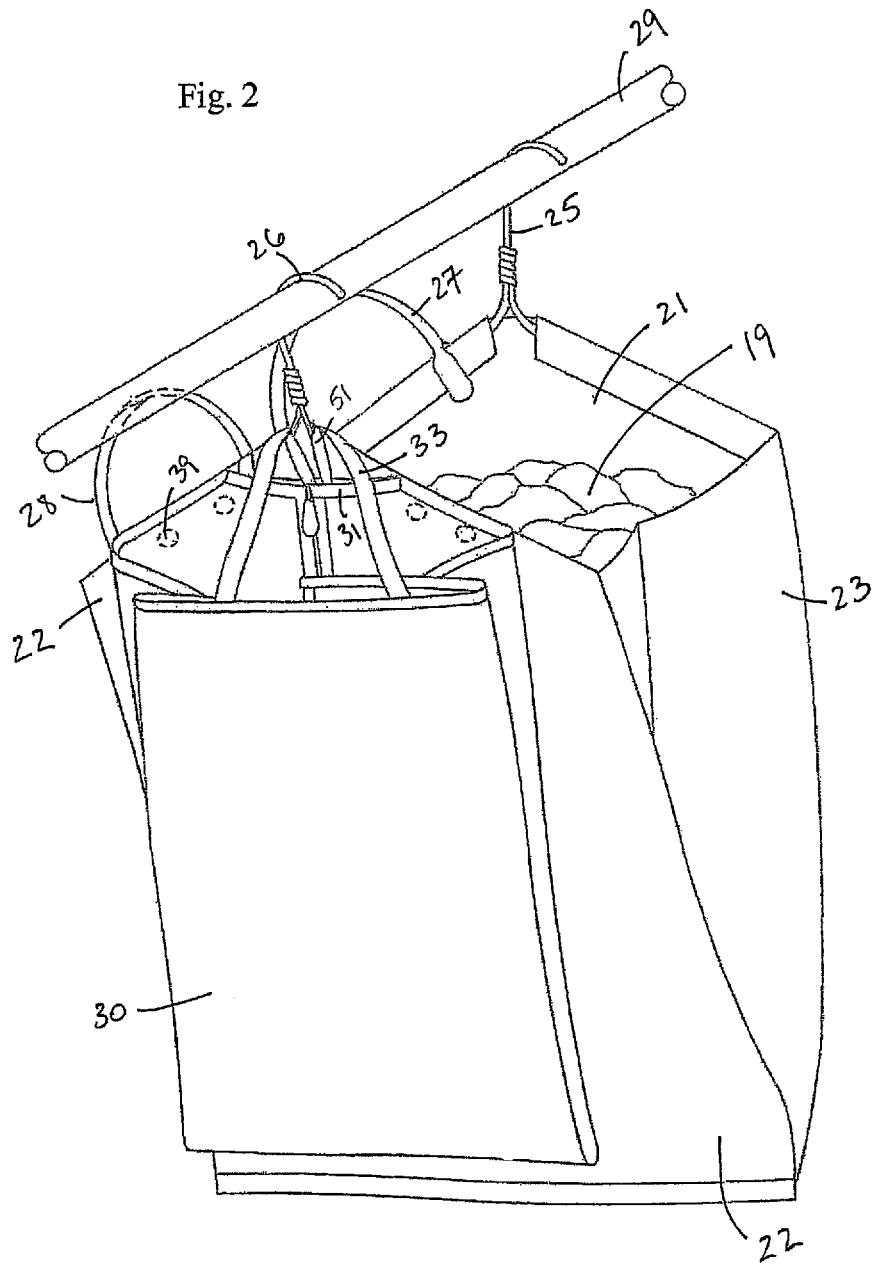
FIG. 2 is a perspective environmental view of the embodiment of FIG. 1 with the second bag in a folded condition.
Figure 3:
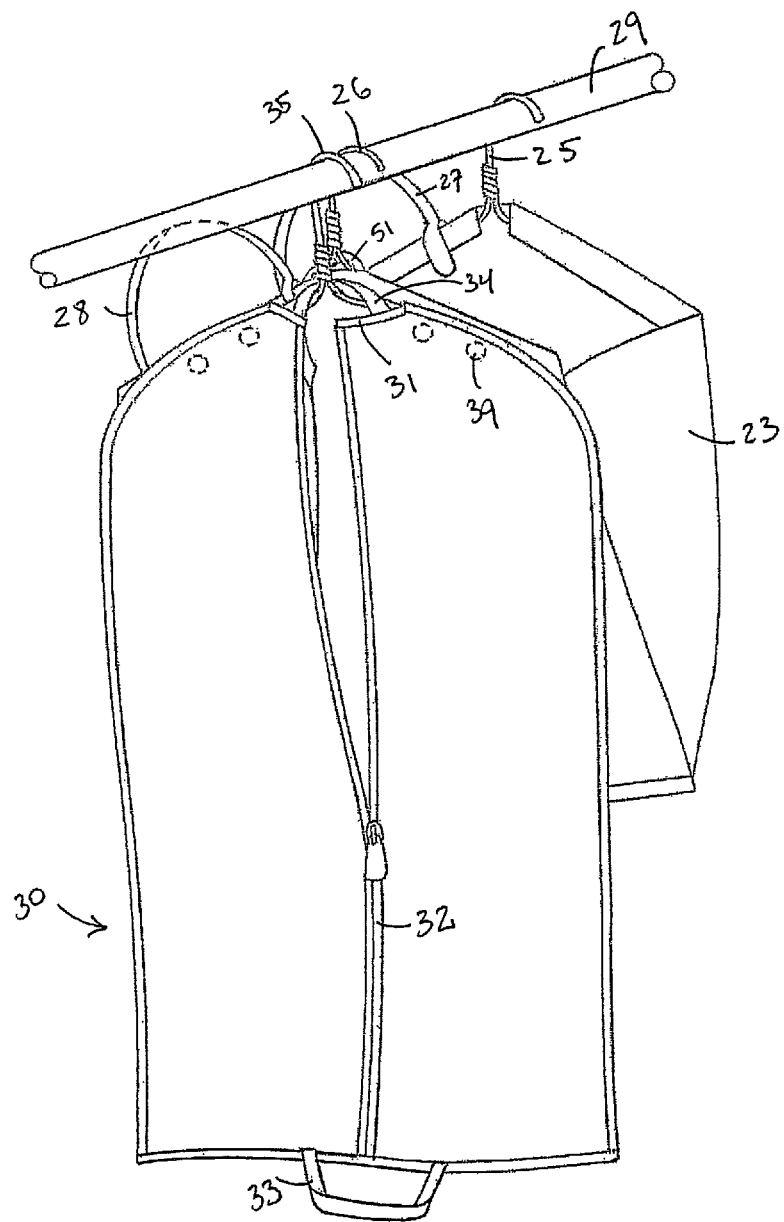
FIG. 3 is a perspective environmental view of the embodiment of FIG. 1 with the second bag in an unfolded condition.

Referring to the drawings wherein like reference characters designate like or corresponding parts throughout the several views, and referring particularly to the illustrated exemplary embodiment of FIGS. 1-3, it is seen that these embodiments of the invention include a first bag 20 having two broad opposing side panels 21, 22 that are attached together at the bottom, and two opposing foldable end panels 23, 24 between the side panels, the four panels 21-24 forming a hamper with an open top. As clothing items 19 are inserted into the first bag 20, the end panels 23, 24 unfold as shown in FIG. 2. In the illustrated embodiment, a first hook 25 is provided at a top edge of side panel 21, and a second hook 26 is provided at a top edge of the other side panel 22. Hooks 25, 26 are used to hang the first bag 20 from a clothing rod 30, as shown in FIGS. 2 and 3. A first handle 27 may be provided along the top edge of side panel 21, and a second handle 28 may be provided along the top edge of the other side panel 22 to allow a user to grasp and hold bag 20 during transport.

In the illustrated exemplary embodiment of FIGS. 1-3, a second bag 30 is provided adjacent to side panel 22. The top of the second bag 30 may be attached at, near or along a portion of the top edge of side panel 22. An outer loop 51 may be provided at the top of the second bag 30 that may be engaged over one of the hooks 25, 26 of the first bag 20. In these embodiments, bags 20 and 30 may be separated from each other by disengaging loop 51 from hook 25 or 26. Loop 51 may be in the form of a cord or strap, or may be provided in the form of a metal bracket 52 shown in FIGS. 12A-B having a loop 51 at the top for engagement over one of hooks 25, 26. An optional loop 34 may be provided with bag 30 to hold these hanger hooks 35 together. It is to be appreciated that bag 30 may be provided on the other side panel 23.

FIGS. 1 and 2 show the second bag 30 folded up into a compact form against side panel 22 when not in use (e.g., when dirty items 19 are being collected in the first bag 20). Bag 30 is provided with an opening 31 at its top for receiving the hanger hooks 35 of cleaned items when they are inserted into the unfolded second bag, as shown in FIG. 3 and in other figures. Bag 30 is also provided with a strap or loop 33 at its bottom that may be placed around the hook at the top of the adjacent side panel (e.g. 26) of the first bag 20 to hold the folded second bag 30 in place against the side panel 22, as shown in FIGS. 1 and 2. A zipper 32 or other closing device is provided along one side of bag 30 for opening and closing the bag for insertion and removal of clean garments, clothing and other items.

In the illustrated embodiment of FIGS. 1-3, bag 30 may or may not be attached to the side panel 22 of bag 20. If they are not attached, loop 51 is used to hold bag 30 against bag 20. In the illustrated embodiments of FIGS. 1-6, a plurality of optional snaps 39 are provided along the top of one side of bag 30 for temporary attachment to corresponding snaps along the top of side panel 22. It is to be appreciated that snaps 39 may be replaced with suitable buttons, clips, zippers, inter-engaging hooks and loops (Velcro®), or the like. The attachment devices 39 are preferably provided at the top of bag 20 and panel 22, but may alternatively be provided in other locations in order to secure the second bag 30 against a side panel 22 of the first bag 20.

Figure 4:
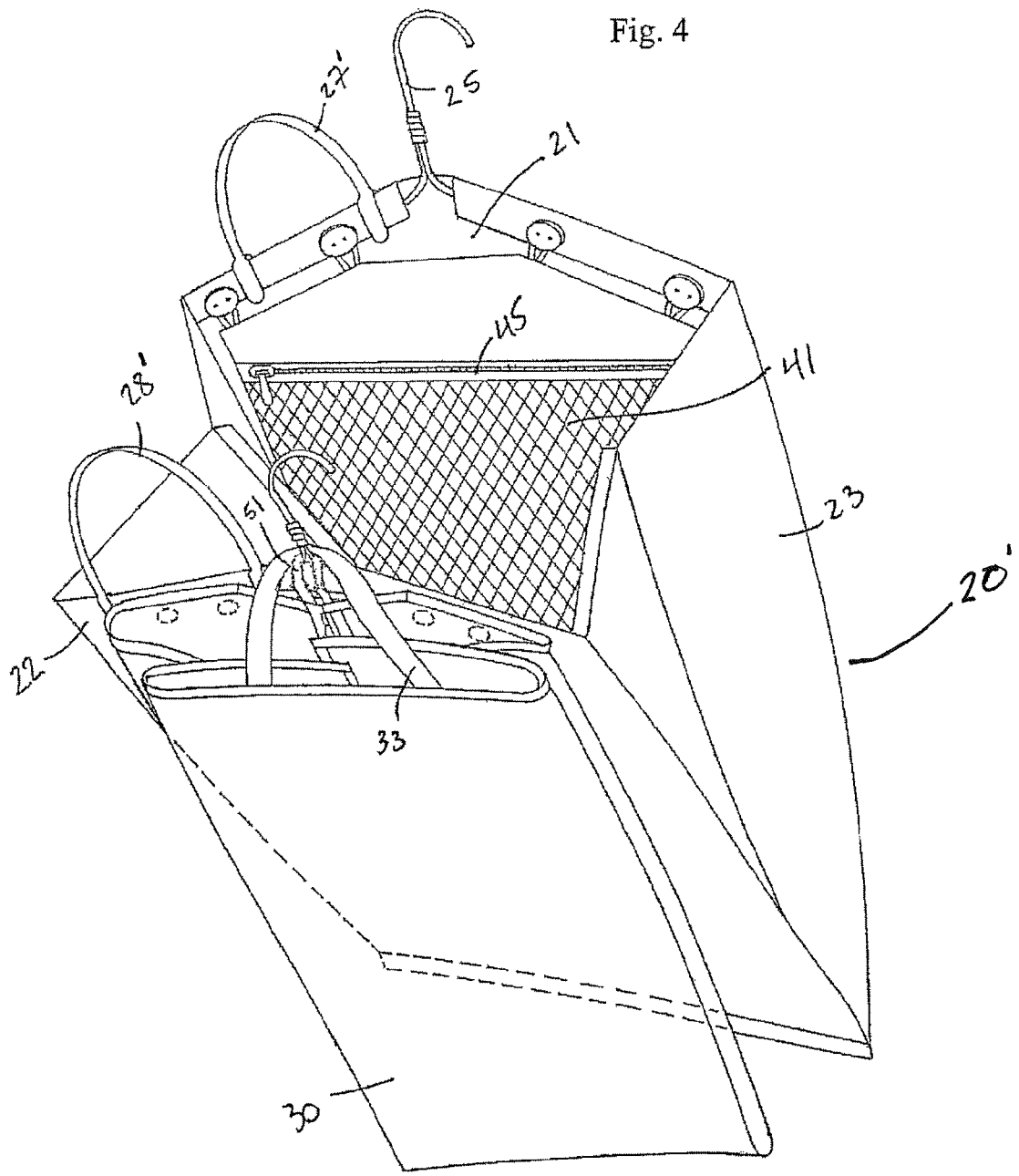
FIG. 4 is a perspective view of another embodiment of the present invention.
Figure 5:
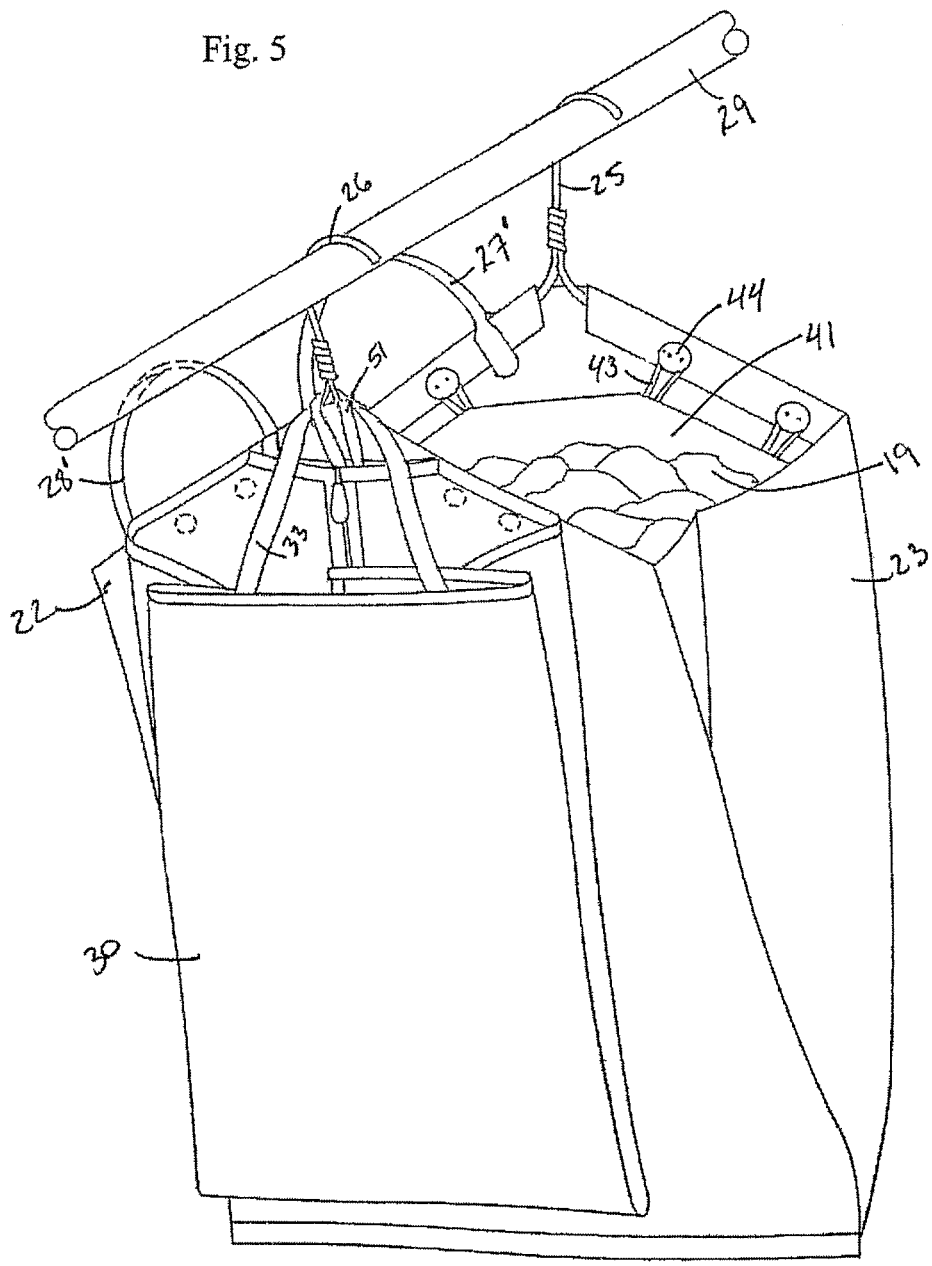
FIG. 5 is a perspective environmental view of the embodiment of FIG. 4 with the second bag in a folded condition.
Figure 6:
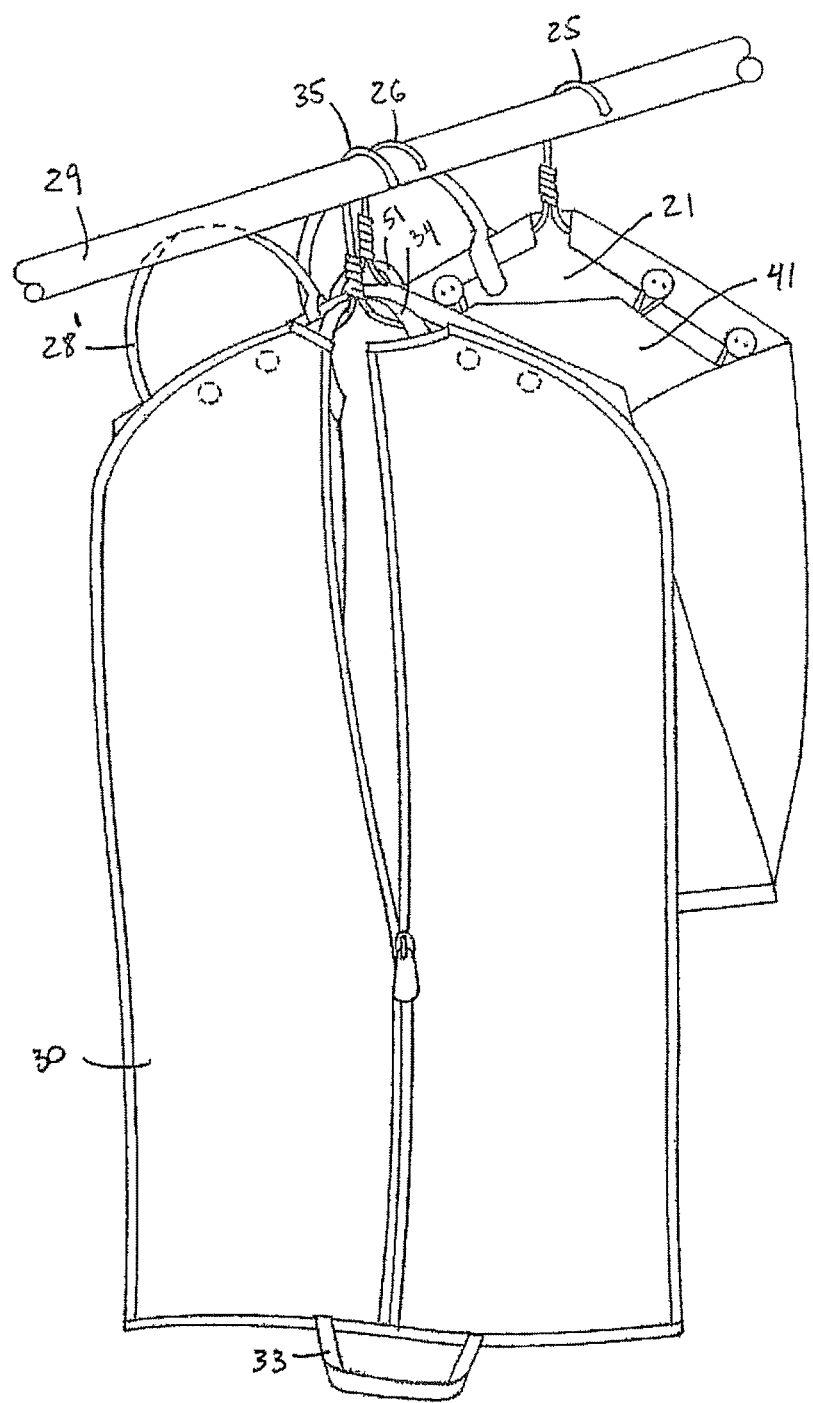
FIG. 6 is a perspective environmental view of the embodiment of FIG. 5 with the second bag in an unfolded condition.

In the embodiment shown in FIGS. 4-6, an optional, detachable accessory bag 41 is provided for insertion inside the first bag 20'. In these embodiments, accessory bag 41 is made of a mesh or netting material, and is attached to the inside of one of the side panels of the first bag, such as 21. Accessory bag 41 may be temporarily held in place using one or more snaps, buttons, clips, zippers, inter-engaging hooks and loops (Velcro®), or the like 44. In the illustrated embodiment, buttons 44 are provided on panel 21, and loops 43 are provided on bag 41 for engagement with buttons 44. The accessory bag 41 may include a zipper 45 along an edge (e.g. along the top) for opening and closing the accessory bag for insertion and removal of small items of clothing.

In the illustrated exemplary embodiments of FIGS. 7-11, loop 51 is provided at the top of the second bag 30 that may be engaged over one of the hooks 25, 26 of the first bag 20". In these embodiments, bags 20" and 30 may be separated from each other by disengaging loop 51 from hook 25 or 26. Loop 51 may be in the form of a cord or strap, or may be provided in the form of a metal bracket 52 having a loop 51 at the top for engagement over one of hooks 25, 26. As shown in FIGS. 12A-B, bracket 52 may include arms that may be sewn into or otherwise attached to the top of bag 30 such that loop 51 protrudes out at the top. An optional loop 34 may be provided with bag 30 to hold hanger hooks 35 together.

Figure 9:
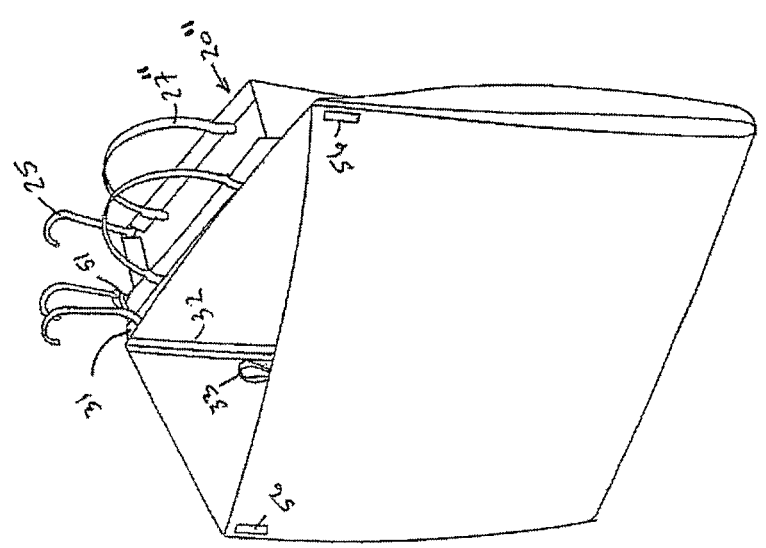
FIG. 9 is a perspective view of the embodiment of FIG. 7 with the second bag in a different partially folded condition.

FIGS. 8 and 9 show the second bag 30 folded up at different levels against side panel 22. The second bag 30 is designed to be folded into these positions when it contains short cleaned items such as shirts or blouses. Bag 30 is provided with a strap or loop 33 at its bottom that may be placed around the hook at the top of the adjacent side panel (e.g. 26) of the first bag 20" to hold the folded second bag 30 in place against the side panel 22. This loop 33 may also be attached over one or more buttons 55 to hold bag 30 in a partially folded position, as shown in FIG. 8. It is to be appreciated that although the illustrated embodiment shows only one button 55, additional buttons may be provided at different locations on bag 30 for engagement with loop 33 to allow bag 30 to be folded up at different levels/places. See FIGS. 17-28. In addition to, or as an alternative to buttons 55, one or more interengaging strips of hooks and loops 56 (Velcro®) may be provided at different locations on bag 30 to allow bag 30 to be folded up, as shown in FIG. 9. As with buttons 55, it is to be appreciated that although the illustrated embodiment shows some locations for strips 56, additional strips 56 may be provided at different locations on bag 30 to allow bag 30 to be folded up at different levels/places. When not in use (e.g., when dirty items 19 are being collected in the first bag 20"), bag 30 may also be folded as shown in FIGS. 8 and 9, or completely folded as shown in FIG. 2.

Figure 10:
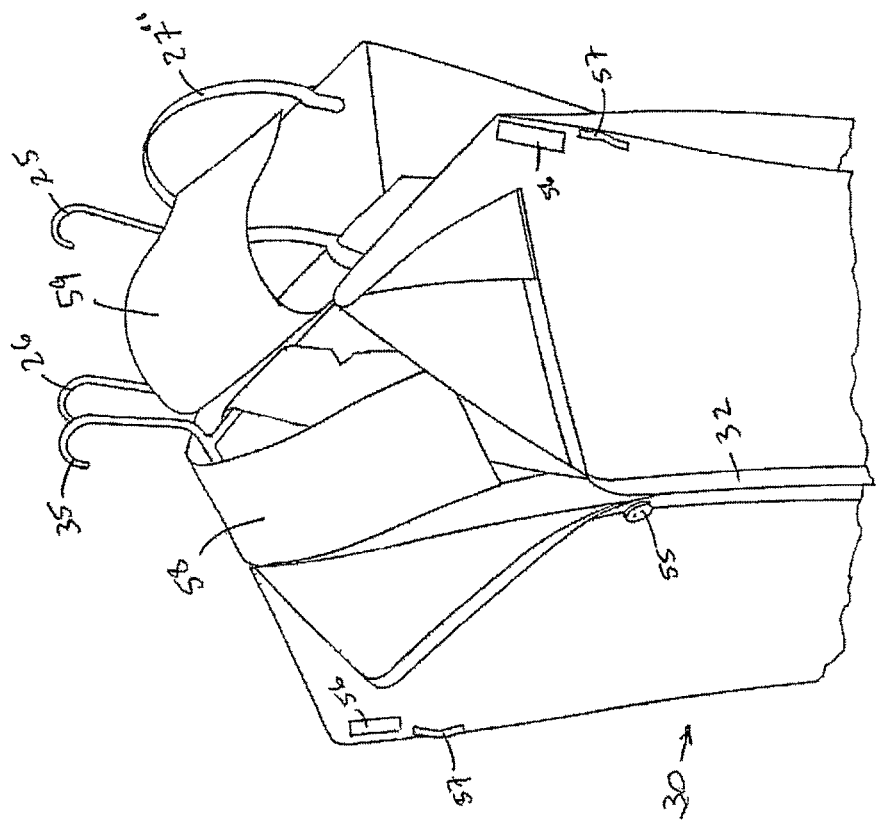
FIG. 10 is a detailed view of another embodiment of the invention showing the use of upper protective flaps.
Figure 11:
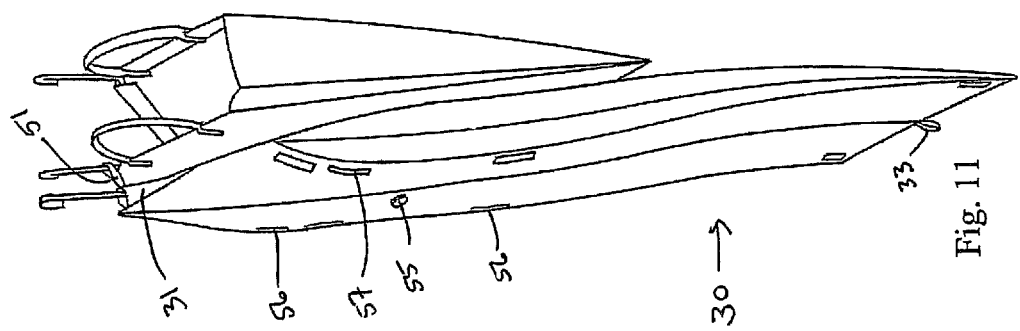
FIG. 11 is a side perspective view of the embodiment of FIG. 7.
Figure 12B:
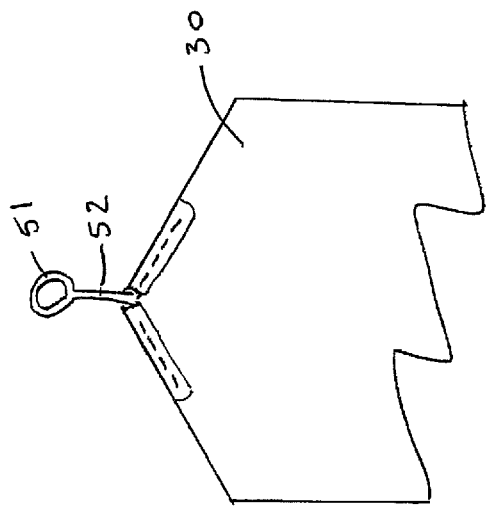
FIG. 12B is a perspective view of a metal bracket installed and in use with an embodiment of the invention.
Figure 12A:
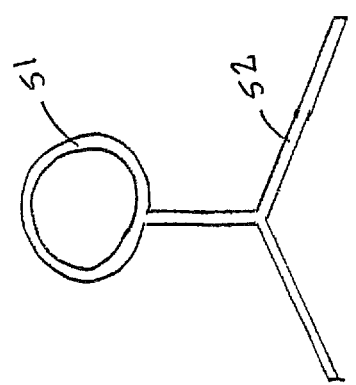
FIG. 12A is a perspective view of a metal bracket used with embodiments of the invention.

Referring to FIGS. 10-11, it is seen that in the exemplary illustrated embodiment, bag 30 is provided with an expandable opening 31 at its top for receiving a large number of hanger hooks 35 of cleaned items when they are inserted into the unfolded second bag. Bag 30 may also be pleated along the sides to allow it to expand. In these embodiments, flaps 58 and/or 59 may be provided on the inside of bag 30 to be folded over the tops of the hanging garments to protect them from foreign materials (e.g., dust, dirt, water, etc.) that could enter through opening 31, as shown in FIG. 10. An additional loop 34 (not shown) may also be provided with bag 30 to hold the numerous hanger hooks 35 together. As with other embodiments, bag 30 is provided with a zipper 32 or other closing device along one side, and also provided with a strap or loop 33 at its bottom that may be placed around a hook at the top of the adjacent side panel (e.g. 26) of the first bag 20" to hold the folded second bag 30 in place against the side panel 22.

In some embodiments, one or more optional loops 57 may be provided on the outside of the second bag 30 to which labels or customer identification tags may be attached.

In alternative embodiments (not shown), a third bag 40 having some or all of the available features of the second bag 30 may be provided for attachment to the opposite side panel (e.g. 21) of the first bag 20", to provide additional capacity for the return of cleaned items. In these embodiments, loop 51A on the third bag 40 may be engaged over hook 25 of panel 21 to hold the bags adjacent to each other; or bag 40 may be attached to or detachable from side panel 21.

Figure 14:
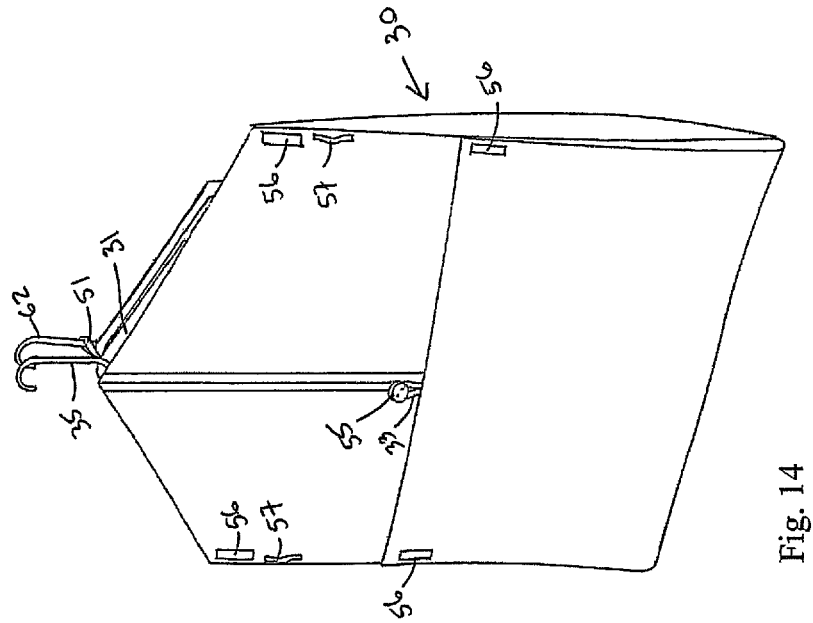
FIG. 14 is a perspective view of the embodiment of FIG. 13 in a partially folded condition.
Figure 13:
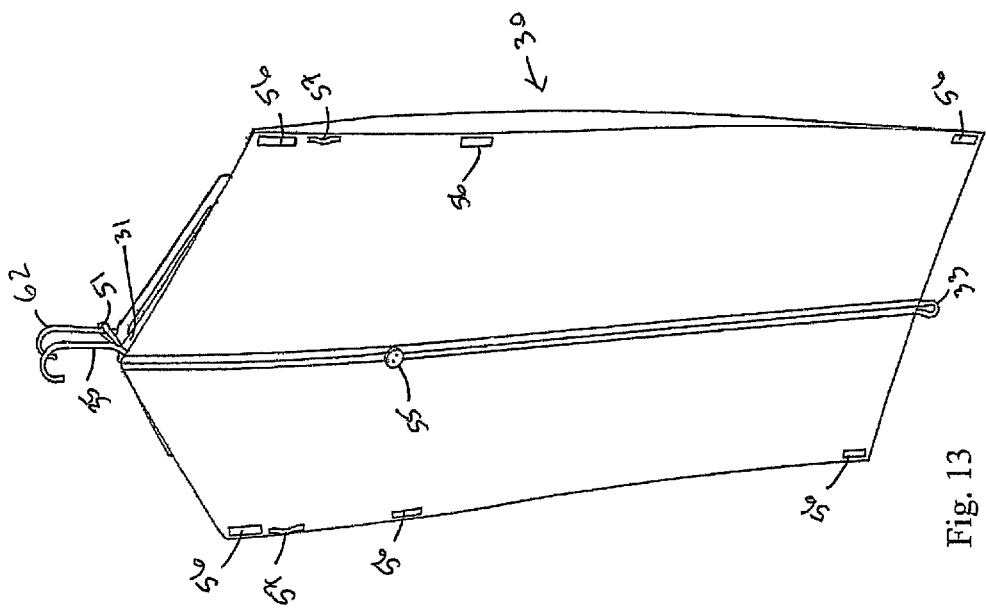
FIG. 13 is a perspective view of another embodiment of the present invention in an unfolded condition.
Figure 15:
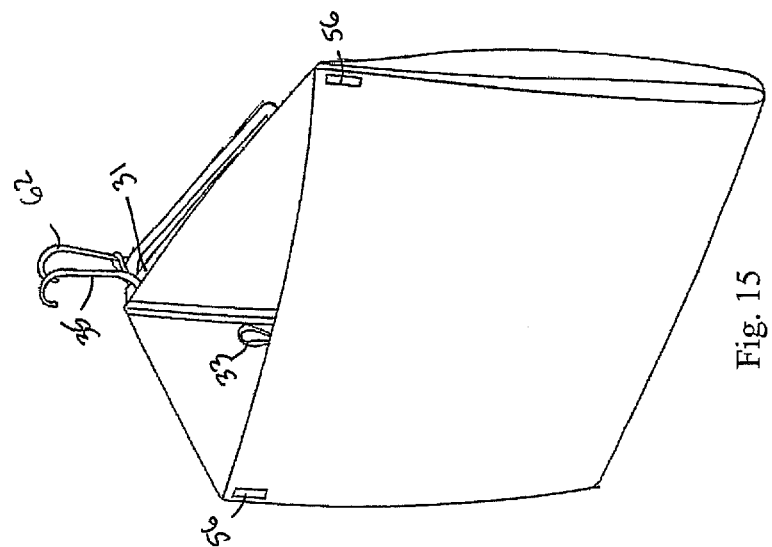
FIG. 15 is a perspective view of the embodiment of FIG. 13 in a different partially folded condition.
Figure 19:
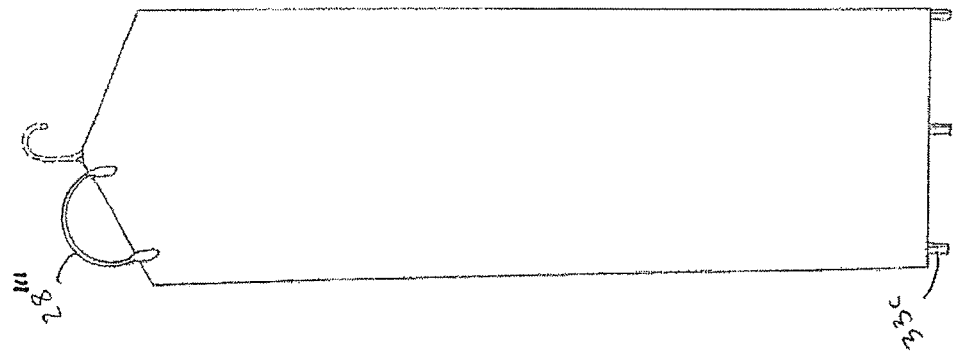
FIG. 19 is a rear view of the embodiment of FIG. 17.
Figure 18:
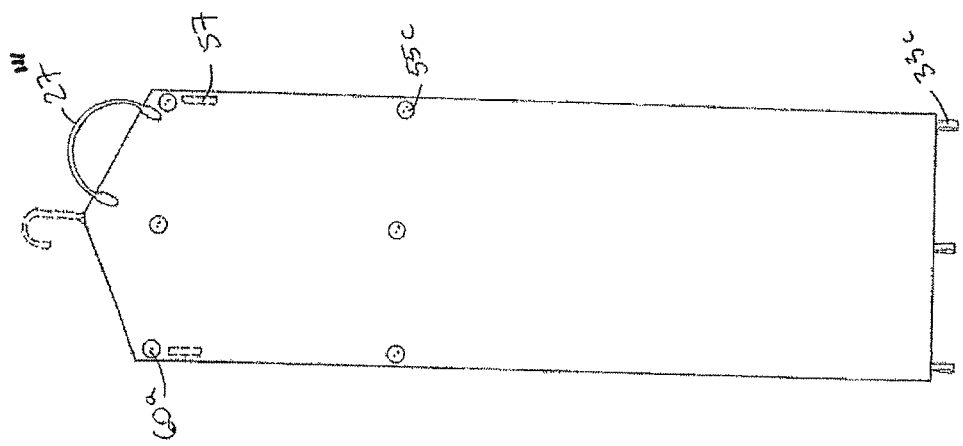
FIG. 18 is a front view of the embodiment of FIG. 17.
Figure 17:
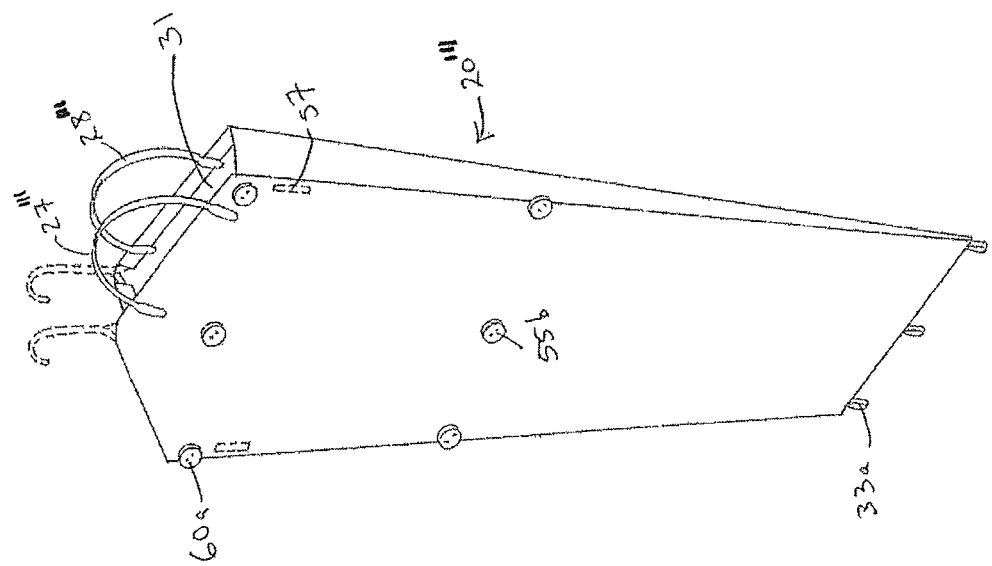
FIG. 17 is a perspective view of another embodiment of the present invention in an unfolded condition.
Figure 22:
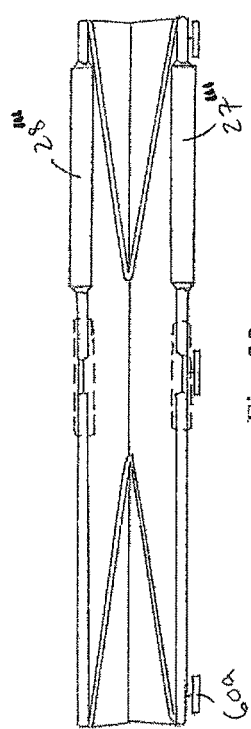
FIG. 22 is a top plan view of the embodiment of FIG. 17.
Figure 23:
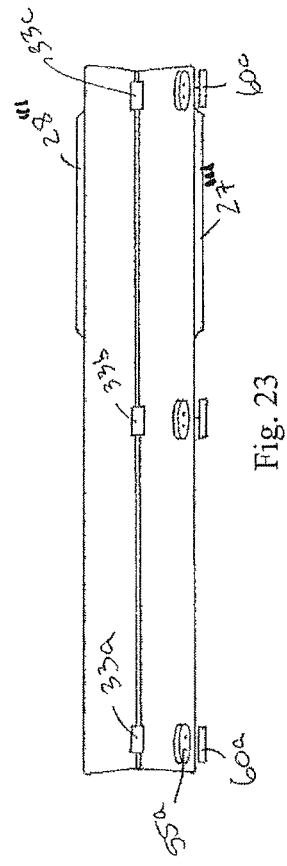
FIG. 23 is a bottom plan view of the embodiment of FIG. 17.
Figure 21:
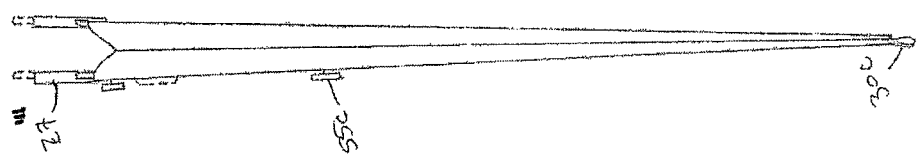
FIG. 21 is a right side view of the embodiment of FIG. 17.
Figure 20:
FIG. 20 is a left side view of the embodiment of FIG. 17.

In alternative embodiments, such as those shown in FIGS. 13-16, bag 30 is provided by itself without bag 20. In these embodiments, a loop 51 is provided at the top of bag 30 that may be engaged over a hook of an adjacent hanger 62. In these embodiments, bag 30 may be separated from hanger 62 by disengaging loop 51 from hanger 62. Loop 51 may be in the form of a cord or strap, or may be provided in the form of a metal bracket 52 having a loop 51 at the top for engagement over a hanger 62. Bag 30 may be folded up at different levels depending on the length of the clean garments hanging inside. Bag 30 is provided with a strap or loop 33 at its bottom that may be placed around the hook of a hanger 62 for support. This loop 33 may also be attached over one or more buttons 55 to hold bag 30 in a partially folded position, as shown in FIG. 14. It is to be appreciated that although the illustrated embodiment shows only one button 55, additional buttons may be provided at different locations on bag 30 for engagement with loop 33 to allow bag 30 to be folded up at different levels/places. In addition to, or as an alternative to buttons 55, one or more interengaging strips of hooks and loops 56 (Velcro®) may be provided at different locations on bag 30 to allow bag 30 to be folded up, as shown in FIG. 15. As with buttons 55, it is to be appreciated that although the illustrated embodiment shows some locations for strips 56, additional strips 56 may be provided at different locations on bag 30 to allow bag 30 to be folded up at different levels/places. When not in use bag 30 may also be folded as shown in FIGS. 14 and 15, or completely folded as shown in FIG. 2.

Figure 16:
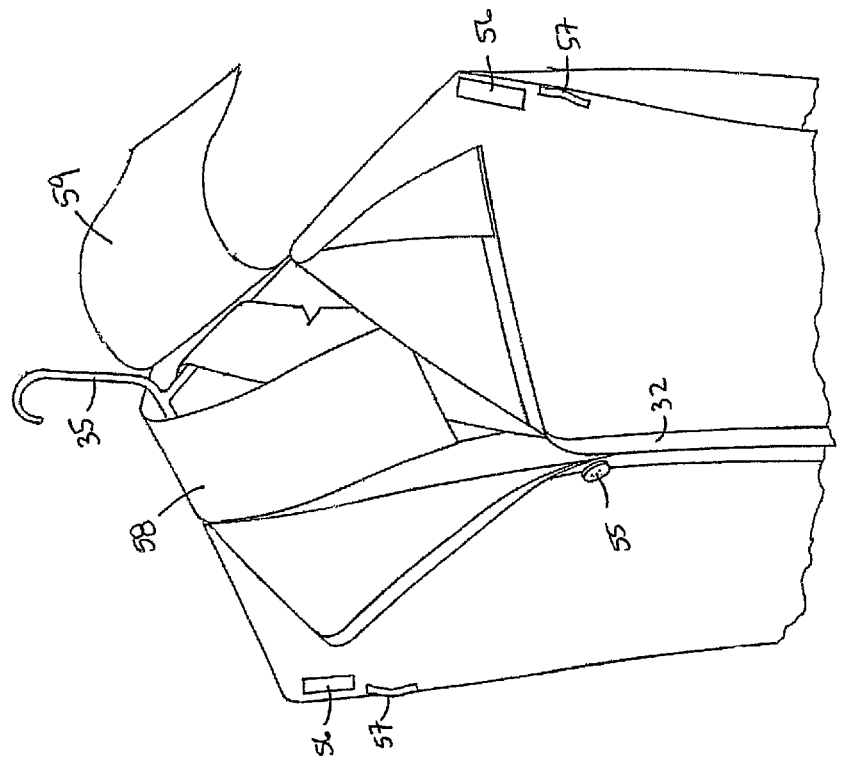
FIG. 16 is a detailed view of another embodiment of the invention showing the use of upper protective flaps.

Referring to FIGS. 13-16, it is seen that in the exemplary illustrated embodiment, bag 30 is provided with an expandable opening 31 at its top for receiving a large number of hanger hooks 35 of cleaned items when they are inserted into the unfolded bag 30. Bag 30 may also be pleated along the sides to allow it to expand. In these embodiments, flaps 58 and/or 59 may be provided on the inside of bag 30 to be folded over the tops of the hanging garments to protect them from foreign materials (e.g., dust, dirt, water, etc.) that could enter through opening 31, as shown in FIG. 16. An additional loop 34 (not shown) may also be provided with bag 30 to hold the numerous hanger hooks 35 together. As with other embodiments, bag 30 is provided with a zipper 32 or other closing device along one side, and also provided with a strap or loop 33 at its bottom that may be placed around a hanger to hold the folded bag 30 in place. In some embodiments, one or more optional loops 57 may be provided on bag 30 to which labels or customer identification tags may be attached.

Figure 25:
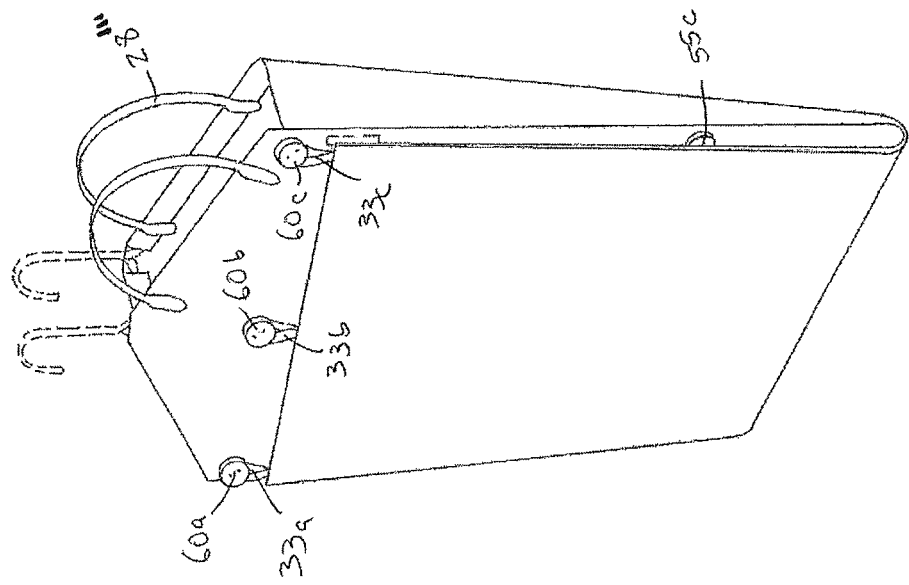
FIG. 25 is a perspective view of the embodiment of FIG. 24 in a different partially folded condition.
Figure 24:
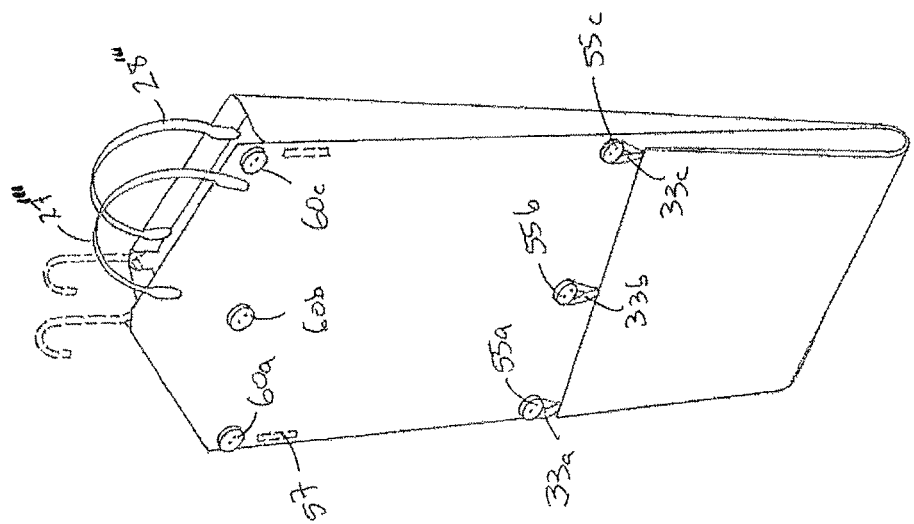
FIG. 24 is a perspective view of an embodiment of the present invention in a partially folded condition.
Figure 26:
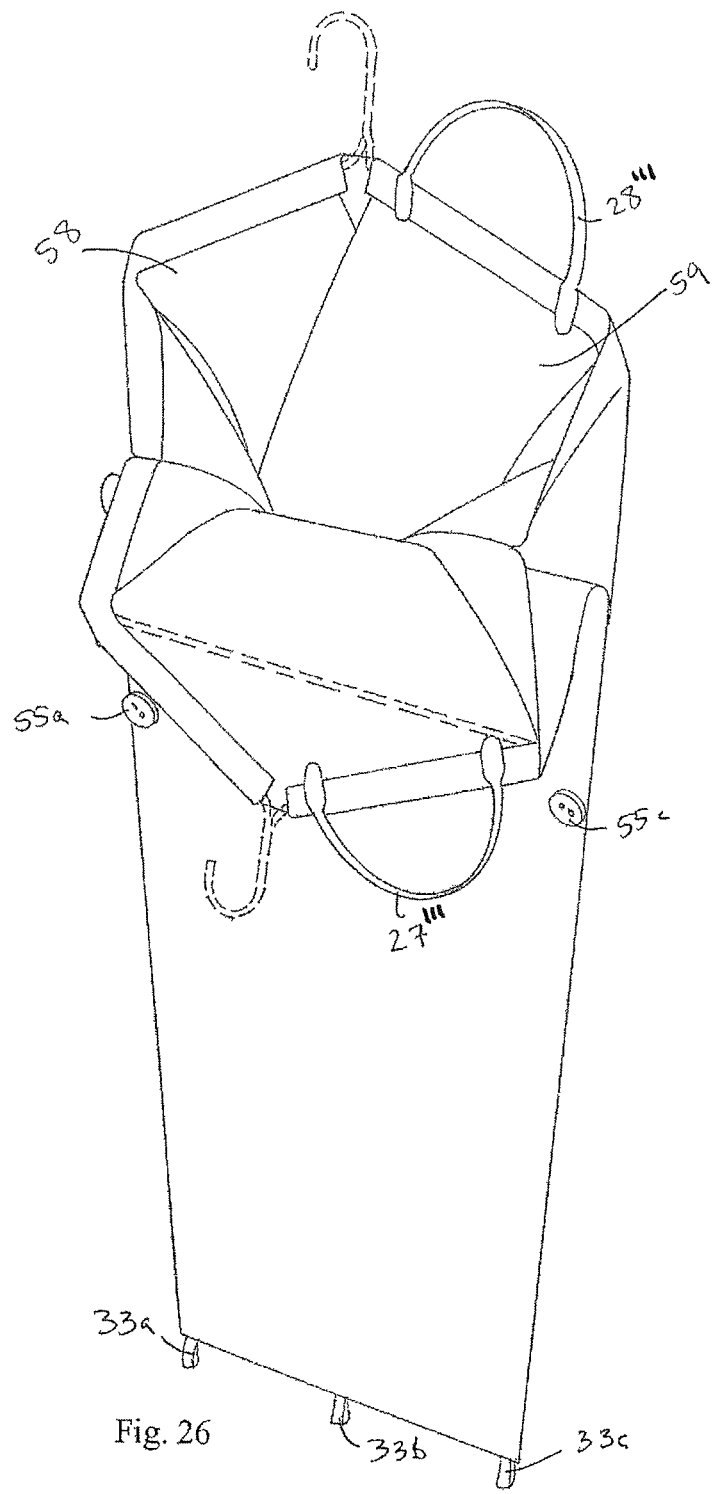
Figure 27:
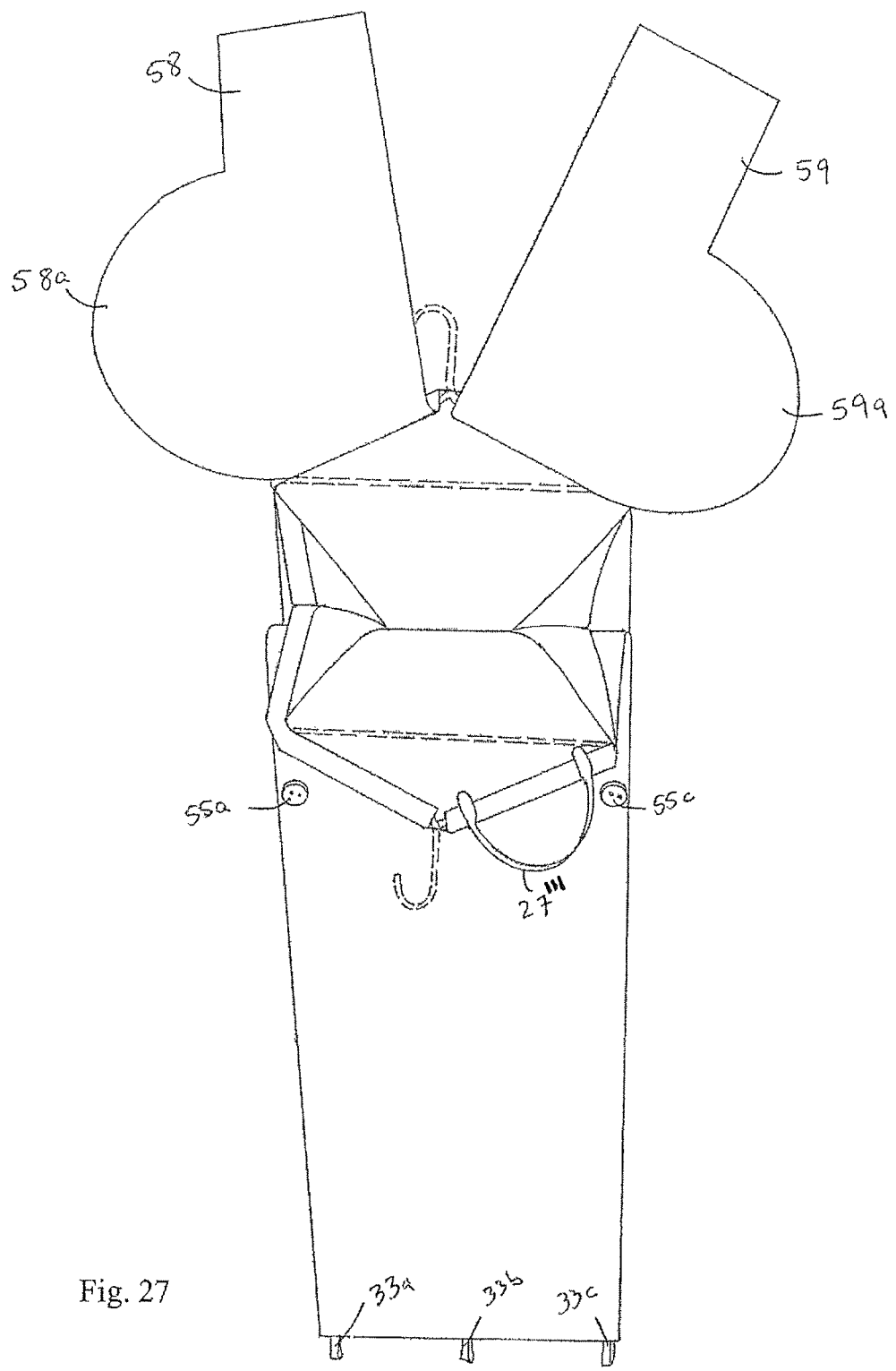
FIG. 27 is a perspective view of the embodiment of FIG. 26 an open condition showing internal flaps folded out.
Figure 28:
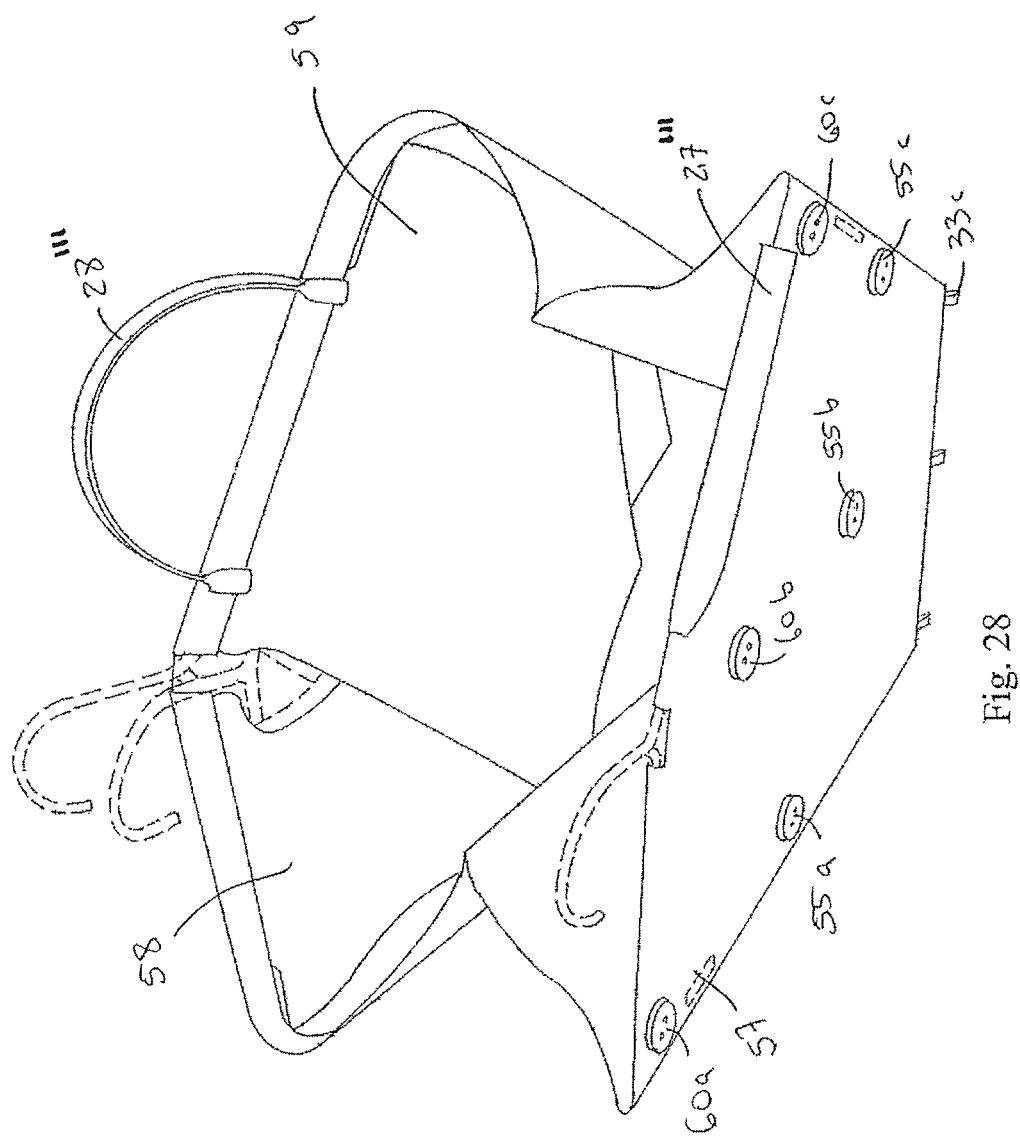

Referring to FIGS. 17-28, it is seen that in these exemplary illustrated embodiments, bag 20''' is provided with an expandable opening 31 at its top for receiving a large number of hanger hooks 35 supporting cleaned items when they are inserted into the unfolded bag 20'''. Bag 20''' may also be pleated along the sides to allow it to expand. In these embodiments, flaps 58 and/or 59 may be provided on the inside of bag 20''' to be folded over the tops of the hanging garments to protect them from foreign materials (e.g., dust, dirt, water, etc.) that could enter through opening 31, as shown in FIGS. 26-28. In some embodiments, flaps 58, 59 may in include additional extended portions 58a and 59a, as shown in FIG. 27, that may be engaged around clothing hanging in bag 20''' to provide additional protection from foreign materials. An additional loop 34 (not shown) may also be provided with bag 20''' to hold the numerous hanger hooks 35 together. In these embodiments, bag 20''' may be provided with one or more straps or loops such as 33a, 33b and 33c at its bottom that are designed to be placed around corresponding buttons such as 55a, 5b and 55c to hold bag 20''' in a partially folded position, as shown in FIG. 24. Additional sets of buttons such as 60a, 60b and 60c may be provided in different locations on bag 20''' to allow the bag to be partially folded in another position, such as that shown in FIG. 25. It is to be appreciated that additional sets of buttons may be provided at different locations on bag 20''' to provide additional options for partially folding bag 20''' against itself. It is also to be appreciated that in alternative embodiments, a single loop (e.g. 33b) and a single button (55b) or buttons (55b and 57b) may be provided. In other embodiments, a pair of loops (e.g. 33a/33c) and a pair of buttons (55a/55c) or buttons (60a/60c) may be provided. In other embodiments, four or more loops and corresponding buttons may be provided.

It is to be appreciated that although the illustrated embodiments show three sets of buttons 55 and 60, additional buttons may be provided at different locations on bag 20 for engagement with loops 33 to allow bag 20 to be folded up at different levels/places. In addition to, or as an alternative to buttons 55 and 60, one or more interengaging strips of hooks and loops (e.g. Velcro®) may be provided at different locations on bag 20 to allow bag 20 to be folded up. As with buttons 55 and 60, it is to be appreciated that although the illustrated embodiment shows some locations for the buttons, additional strips may be provided at different locations on bag 20 to allow bag 20 to be folded up at different levels/places. When not in use, bag 30 may also be folded as shown in FIGS. 24 and 25. One or more optional loops 57 may be provided on bag 30 to which labels or customer identification tags may be attached.

In use, bag 20 of the multiple bag system is hung on a clothing rod 29 in a closet, with the second bag 30 (and optional third bag 40, if provided) folded up against one side of the bag 20, preferably with loop 51 engaged over a hook 25, 26 of first bag 20. Soiled garments and clothing items 19 are collected in the first bag 20 until it is full enough to take to the laundry/dry cleaner. The laundry/dry cleaner removes the garments and clothing items 19 from the first bag 20 and cleans them. The clean garments and clothing items are then hung on hangers which include hooks 35. The second bag 30 is unfolded and unzipped, and the clean hanging items are inserted into the second bag, with their hanger hooks 35 protruding through the opening 31 in the top of the second bag 30. An optional loop 34 provided with bag 30 may be used to hold hanger hooks 35 together. If multiple items are inserted into bag 30 causing opening 31 to be extended, flaps 54, 55 may be folded over the tops of the clothing items to protect them from dust, dirt, water or other materials. Bag 30 is then zipped up to protect the clean items inside, and may be partially folded up as shown in FIGS. 8 and 9 if only short items (e.g., shirts/blouses) have been inserted into second bag 30, to allow it to be placed on a short garment conveyor, and for ease of transport. Additional items may be inserted into a third bag 40, if provided, which may be zipped and folded as with second bag 30. The bags are then returned to the user, with bag 30 (and 40, if provided) protecting the clean items during transport. Upon or following return, the user removes the clean items from bag 30 (and 40, if provided), and then folds the second bag up against a side of the first bag 20. The cycle is then repeated, with dirty and soiled garments again being collected in the first bag 20 until it is full enough to take to the laundry/dry cleaner.

In use, the alternative bag 30 of the embodiments of FIGS. 13-16 is hung in a folded or unfolded condition on a hanger 62 in the closet of a user. Empty bag 30 is delivered to the dry cleaner along with dirty garments, clothing and laundry items to be cleaned. The dirty items are cleaned, and then hung on hangers 35. If no bag 30 is provided by the user, the dry cleaner may provide one. Bag 30 is unfolded and unzipped, and the clean hanging items are inserted into the bag, with their hanger hooks 35 protruding through the opening 31 in the top of bag 30. An optional loop 34 provided with bag 30 may be used to hold hanger hooks 35 together. If multiple items are inserted into bag 30 causing opening 31 to be extended, flaps 58, 59 may be folded over the tops of the clothing items to protect them from dust, dirt, water or other materials. Bag 30 is then zipped up to protect the clean items inside, and may be partially folded up as shown in FIGS. 14 and 15 if only short items (e.g., shirts/blouses) have been inserted into second bag 30, to allow it to be placed on a short garment conveyor, and for ease of transport. The bag is then returned to the user, with bag 30 protecting the clean items during transport. Upon or following return, the user removes the clean items from bag 30 and may then fold the bag up or leave it unfolded, hanging it on a hanger 62 using loop 51. The cycle is then repeated, with dirty and soiled garments again being collected and delivered with bag 30 to the laundry/dry cleaner.

In use, the alternative bag 20''' of the embodiments of FIGS. 17-28 is hung in a folded or unfolded condition on a hanger 62 in the closet of a user. Empty bag 20''' is delivered to the dry cleaner along with dirty garments, clothing and laundry items to be cleaned. The dirty items are cleaned, and then hung on hangers 35. If no bag 20''' is provided by the user, the dry cleaner may provide one. Bag 20''' is unfolded, and the clean hanging items are inserted into the bag, with their hanger hooks 35 protruding through the opening 31 in the top of bag 20'''. An optional loop 34 provided with bag 20''' may be used to hold hanger hooks 35 together. If multiple items are inserted into bag 20''' causing opening 31 to be extended, flaps 58, 59 may be folded over the tops of the clothing items to protect them from dust, dirt, water or other materials. Bag 20''' may be partially folded up as shown in FIGS. 24 and 25 if only short items (e.g., shirts/blouses) have been inserted into bag 20''', to allow it to be placed on a short garment conveyor, and for ease of transport. The bag is then returned to the user, with bag 20''' protecting the clean items during transport. Upon or following return, the user removes the clean items from bag 20''' and may then fold the bag up or leave it unfolded, hanging it on a hanger 62. The cycle is then repeated, with dirty and soiled garments again being collected and delivered with bag 20''' to the laundry/dry cleaner.

It is to be understood that variations and modifications of the present invention may be made without departing from the scope thereof. In particular, different embodiments of the first 20 and second bag 30 of the invention may include different combinations or permutations of some or all of the various features illustrated and/or described herein. It is also to be understood that the present invention is not to be limited by the specific embodiments disclosed herein, but only in accordance with the appended claims when read in light of the foregoing specification.

What is claimed is:

1. A dual use garment bag comprising:
a pair of oppositely positioned side panels joined together at a closed bottom end, said side panes having sloping upper sides, and a pair of oppositely positioned pleated end panels opening at a top attached between said side panels forming said bag, said bag being open at an opposite upper end and having an interior and an exterior;
two flaps provided on the interior of said bag adjacent to said upper end, one flap at or near each of said upper sides of one of said side panels, for folding over items hanging inside said bag to protect the items from outside materials, wherein said flaps each have a lateral portion having a substantially semi-circular shape capable of covering the shoulder portion of a shirt or jacket, and a medial portion having a substantially rectangular shape capable of covering a front portion of a shirt or jacket;
a pair of hanger hooks, one provided on each of said sides at said upper end;
a pair of handles, one provided on each of said sides at said upper end;
at least one lower engagement device located on the exterior adjacent to the bottom end of said bag; and
at least one upper attachment device provided on the exterior of a side panel of said bag for engagement with said at least one lower engagement device for holding a portion of said bag against itself in a folded condition.

2. The bag of claim 1 wherein said at least one lower engagement device is a loop, and said at least one upper attachment device is a button.

3. The bag of claim 2 wherein a pair of loops and at least one pair of buttons are provided on said bag.

4. The bag of claim 2 wherein at least three loops and at least one set of three buttons are provided on said bag.

5. The bag of claim 2 wherein at least three loops and at least two sets of three buttons are provided on said bag.

6. A garment bag comprising:

a. a pair of side panels, each side panel having a top, bottom and sides wherein the bottoms thereof are attached together, said side panels having sloping upper sides;

b. a pair of pleated end panels attached to the bottoms and sides of said side panels forming a bag having a closed bottom, an open top, an inside and an outside;

c. two flaps attached to said top of one of said side panels, said flaps operable to fold over and cover an upper end of one or more garments placed inside said bag thereby protecting the garments from outside materials, wherein said flaps each have a lateral portion having a substantially semi-circular shape capable of covering the shoulder portion of a shirt or jacket, and a medial portion having a substantially rectangular shape capable of covering a front portion of a shirt or jacket;

d. a pair of hanger hooks, one provided on each of said sides at said open top;

e. a pair of handles, one provided on each of said sides at said open top;

f. three lower engagement devices located on the outside of the closed bottom of said bag in a generally horizontal relationship to each other; and g. three corresponding upper attachment devices located on the outside of a side panel of said bag in a generally horizontal relationship to each other for engagement with said three lower engagement devices for holding a portion of said bag against itself in a folded condition.

7. The bag of claim 6 wherein a second set of three upper attachment devices are provided on the outside of a side of said bag in a generally horizontal relationship to each other and spaced apart from said first set of three upper attachment devices.

8. The garment bag of claim 6 further comprising a detachable accessory bag for attachment to the inside of one of said side panels of said garment bag.

9. A garment bag comprising:

a. a pair of side panels, each side panel having a top, bottom and sides wherein the bottoms thereof are attached together;

b. a pair of pleated end panels attached to the bottoms and sides of said side panels forming a bag having a closed bottom, an open top, an inside and an outside;

c. two flaps attached to said top of one of said side panels, said flaps operable to fold over and cover an upper end of one or more garments placed inside said bag thereby protecting the garments from outside materials, wherein said flaps each have a lateral portion having a substantially semi-circular shape capable of covering the shoulder portion of a shirt or jacket, and a medial portion having a substantially rectangular shape capable of covering a front portion of a shirt or jacket;

d. a pair of hanger hooks, one provided on each of said sides at said open top;

e. a pair of handles, one provided on each of said sides at said open top;

f. two lower engagement devices located on the outside of the closed bottom of said bag in a generally horizontal relationship to each other; and g. two corresponding upper attachment devices located on the outside of a side panel of said bag in a generally horizontal relationship to each other for engagement with said two lower engagement devices for holding a portion of said bag against itself in a folded condition.

10. The garment bag of claim 9 further comprising a detachable accessory bag for attachment to the inside of one of said side panels of said garment bag.

11. A bag for transporting garments comprising:

a pair of oppositely positioned side panels, and a pair of oppositely positioned end panels attached between said side panels forming said bag, said bag having an opening at an upper end thereof and having an interior and an exterior;

two flaps provided on the interior of said bag adjacent to said upper end for folding over items hanging inside said bag to protect the items from outside materials, wherein said flaps each have a lateral portion having a substantially semi-circular shape operable to cover a shoulder portion of a garment, and a medial portion having a substantially rectangular shape operable to cover a front portion of a garment;

at least one lower engagement device located on the exterior of said bag; and at least one upper attachment device provided on the exterior of a side panel of said bag for engagement with said at least one lower engagement device for holding a portion of said bag against itself in a folded condition.

12. The bag of claim 11, further comprising a pair of handles, one provided on each of said side panels near said upper opening end.

13. The bag of claim 11, further comprising a pair of hanger hooks, one provided on each of said side panels near said upper opening end.

14. The bag of claim 11, wherein said at least one lower engagement device comprises three lower engagement devices located on the exterior of one of said side panels near a bottom end of said bag in a generally horizontal relationship to each other, and said at least one upper attachment device comprises three upper attachment devices located on the outside of the same side panel of said bag in a generally horizontal relationship to each other for engagement with said three lower engagement devices.

15. The bag of claim 11 further comprising a closable opening along a portion of one of said side panels, wherein a plurality of snaps are provided along said closable opening.

16. A garment bag comprising:

a. two side panels and two end panels connecting lateral portions of said side panels;

b. an opening at an upper end of said bag;

c. a closable opening along a portion of one of said side panels;

d. two flaps attached to said bag near said upper opening, said flaps operable to cover an upper end of at least one garment placed inside said bag, wherein said flaps each have a lateral portion having a substantially semi-circular shape operable to cover a shoulder portion of a garment, and a medial portion having a substantially rectangular shape operable to cover a front portion of a garment; and d. a plurality of engagement devices on an outside of said bag for holding said bag in a folded condition.

17. The bag of claim 16, further comprising a pair of hanger hooks, one provided on each of said side panels near said upper opening.

18. The bag of claim 16, further comprising a pair of handles, one provided on each of said side panels near said upper opening.

19. The bag of claim 16, wherein said flaps are on opposite lateral sides of said bag.

20. The bag of claim 16, wherein said plurality of engagement devices comprises:

at least one lower engagement device located adjacent to a bottom end of said bag; and at least one upper engagement device for engagement with said at least one lower engagement device for holding a portion of said bag against itself in said folded condition.

21. The bag of claim 16, wherein a plurality of snaps are provided along said closable opening on said side panel.

22. The bag of claim 16 further comprising a detachable accessory bag for attachment to an inside of one of said side panels.

* * * * *